United States Patent
Krahn et al.

(10) Patent No.: US 7,545,786 B2
(45) Date of Patent: Jun. 9, 2009

(54) METHOD FOR ACTIVELY SYNCHRONIZING U-APSD SERVICE PERIODS

(75) Inventors: Oliver J Krahn, Superior, CO (US); Jon E. King, Firestone, CO (US)

(73) Assignee: Polycom, Inc., Pleasanton, CA (US)

( * ) Notice: Subject to any disclaimer, the term of this patent is extended or adjusted under 35 U.S.C. 154(b) by 485 days.

(21) Appl. No.: 11/591,645

(22) Filed: Nov. 1, 2006

(65) Prior Publication Data

US 2008/0101320 A1    May 1, 2008

(51) Int. Cl.
*H04W 4/00*    (2006.01)
(52) U.S. Cl. ............... 370/338; 370/349; 370/389; 370/390; 370/397
(58) Field of Classification Search ............... 370/338
See application file for complete search history.

(56) References Cited

U.S. PATENT DOCUMENTS

2004/0156365 A1*    8/2004    Suzuki et al. ............... 370/389

\* cited by examiner

*Primary Examiner*—Rafael Pérez-Gutiérrez
*Assistant Examiner*—Rahul C Nair
(74) *Attorney, Agent, or Firm*—Robert Schuler

(57) ABSTRACT

A wireless LAN environment includes at least one access point that supports a number of wireless communications devices which are configured to operate in the U-APSD mode. The transmission of packets by an access point to a wireless communications device operating in the U-APDS mode can be accomplished in an efficient manner by coordinating the unscheduled service periods of the wireless communication devices. The service periods are placed into a tightly packed list ordered according to a network address associated with each wireless communications device.

19 Claims, 7 Drawing Sheets

METHOD FOR ACTIVELY SYNCHRONIZING U-APSD SERVICE PERIODS

FIELD OF THE INVENTION

Our invention generally relates to the field of wireless communications in a LAN environment in which a wireless communications device operating in a power save mode is in communications with an access point, and our invention specifically relates to the ordering of the wireless communication device's service periods in relation to the service periods of other wireless communication devices.

BACKGROUND

A power save mode of operation for wireless communications devices, such as a mobile phone, is primarily employed to preserve battery life during the time that these devices are turned on but not transmitting. If a mobile phone has been configured such that the power save mode is active, it will periodically transition from a higher powered state, in which the devices transceiver is turned on, to a lower powered state, in which the device's transceiver is turned off, during periods of inactivity. In this lower powered state, the mobile phone will periodically "wake up" or transition to a higher powered state for a short time in order to receive management information from the access point with which it is associated and then transition back to the lower powered state. Also, the phone will transition to a higher powered state in the event that the user wishes to send a voice message. Generally, an access point will buffer one or more frames of information addressed to a particular mobile phone that is power save mode enabled and which is in a lower powered state until the phone transitions to a higher powered state, at which time the buffer frames could be transmitted to the mobile phone. The process by which a mobile phone is configured to be power save mode capable and the protocol that a wireless LAN (access point) follows to manage the buffering and transmission of frames of information is specified by the IEEE 802.11 standard.

While the power save capability specified by 802.11 addresses the battery life issue, it does not address quality of service issues. To this end, the IEEE 802.11e standard which extends 802.11 into the area of quality of service was developed. Generally, the 802.11e standard specifies formats and protocols to use at an access point and at a mobile phone that enable a wireless LAN to prioritize the delivery of packets of information according to the user priority or access category the packets are assigned. Specifically with respect to 802.11e there are two different power save modes that have been specified by the standard for use to deliver packets of information that have been labeled for priority delivery. One mode allows for the scheduled delivery of traffic by the AP to a phone during scheduled service periods and is referred to as Scheduled Automatic Power Save Delivery (S-APSD) and a second allows for the unscheduled delivery of traffic by the AP to a phone during unscheduled service periods and is referred to as Unscheduled Automatic Power Save Delivery or U-APSD. These scheduled and unscheduled modes of operation are defined from the perspective of the AP and should be used when it is desirable to provide QoS functionality in conjunction with extended battery life. It is recommended that the S-APSD mode be employed by devices using polled access and that the U-APSD mode be employed by devices using contention-based access. Basically, APSD was developed to add QoS functionality to the standard PS-mode.

An unscheduled service period begins when an access point receives a trigger frame from a phone. In response to receiving a trigger frame from a particular mobile phone, an access point will transmit any packets it has buffered to that mobile phone. Trigger frames transmitted by phones when in U-APSD mode can collide with trigger frames transmitted by other phones associated with the same access point causing one or more of the phones to initiate a back-off procedure which has the effect of adding delay to the transmission of voice information. The effect of "collisions" between trigger frames tends to counteract the benefit of U-APSD QoS functionality. Further, U-APSD makes no allowance for prioritizing the delivery of packets, buffered at an access point for delivery to some number of different phones, to any one phone associated with the access point, but rather only prioritizes the buffered packets for delivery to a particular phone.

Therefore, it would be advantageous if a phone could periodically transmit a trigger frame without the possibility that this trigger frame might collide with any other phones trigger frame. Furthermore, it would be beneficial if one phone had access to the medium on a priority basis over other phones also trying to acquire the medium to send voice or data traffic. Still further, it would be beneficial if phones did not have to maintain long lists of phones associated with the same access point.

We have solved the trigger frame collision problem and we have solved the packet prioritization problem between phones while operating in the U-APSD mode by inventing a method that enables a phone to start an unscheduled service period immediately after the end of another phones unscheduled service period without having to contend for the medium in the normal fashion. Further, the method of our invention allows the service periods of all phones associated with a particular access point to be synchronized such that the trigger frames they transmit will not collide with trigger frames transmitted by the other phones associated with the same access point. Still further, the method of our invention arranges the service periods of multiple phones to be consecutively ordered one after the other and separated in time by a minimum inter frame time duration also resulting in more time being available during an unscheduled service period to conduct such operations a dynamic channel access.

SUMMARY OF THE INVENTION

In one embodiment of the method of our invention, a first wireless communications device orders unscheduled service periods according to a network address by building an ordered list of network addresses associated with wireless communications devices that are receiving packets during a current QoS period; a first wireless communications device examines the ordered list to identify a second device that has a network address that comes immediately before it in the ordered list and to identify a third wireless communications device that comes immediately after it in the ordered list; the first wireless communications device then sends a request to the third device, that comes after it in the ordered list, to start its service period before this third device; the third device responses by accepting the request; the first device then uses the network address of the second device to initiate an unscheduled service period; and the third device uses the network address of the first device to initiate an unscheduled service period.

According to another embodiment of our invention, our method minimizes the inter-service period time in an ordered group of wireless communication devices by configuring a first wireless communications device to build an ordered list of network addresses; having the first communications device examine the ordered list to identify a second wireless communications device with a network address that comes immediately before it in the ordered list and to identify a third wireless communications device with a network address that comes immediately after it in the ordered list; and then having the first device send a request to the third device to accept its address as the network address the third device uses to initiate its unscheduled service period; the third device accepting the first devices request; the first device then uses the network address of the second device to initiate an unscheduled service period after waiting less than a specified time interval to begin arbitrating for the medium; and the third device using the network address of the first device to initiate an unscheduled service period after waiting less than a specified time interval to begin arbitrating for the medium.

BRIEF DESCRIPTION OF THE DRAWINGS

FIG. 5b is a continuation of the logical flow diagram in FIG. 5a.

DETAILED DESCRIPTION OF INVENTION

Figure 1:
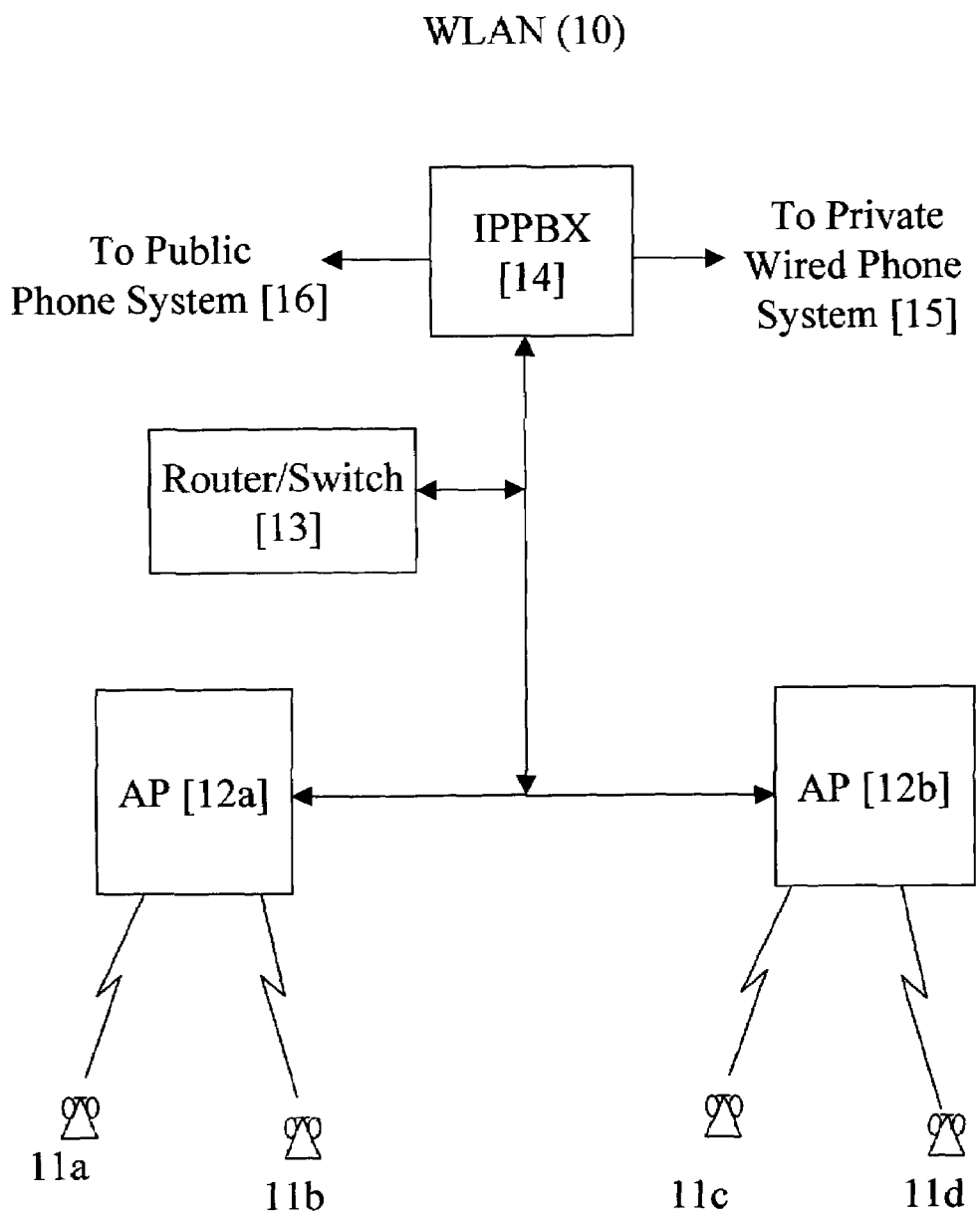
FIG. 1 is a high level block diagram of a wireless LAN.

In order to implement the method and apparatus of our invention, it is necessary to possess a working knowledge of ANSI/IEEE Std 802.11, 1999 Edition (802.11) and IEEE P802.11e/D13.0, January 2005 (802.11e) edition, both of which are hereby incorporated into this application in their entirety, Referring to FIG. 1, QoS capable mobile phones (QSTA) 11a and 11b are associated with QoS capable access point (QAP) 12a and QoS capable mobile phones (QSTA) 11c and 11d are associated with QoS capable access point (QAP) 12b in the wireless LAN (WLAN) 10. The QSTA's and the QAP can be configured to operate in the unscheduled, automatic, power-save, delivery mode or U-APSD mode. A QSTA configured to operate in the U-APSD mode and a QAP configured to operate in the U-APSD mode communicate with each other using the communications protocol and frame formats specified by at least the combination of the 802.11 and 802.11e standards. The process whereby a QSTA associates with a QAP will be described later in more detail. The 802.11e standard specifies QoS enhancements to the 802.11 standard which specifies the medium access control (MAC) and physical layer (PHY) protocols and compatible interconnection of data communications equipment via various wireless mediums in a local area network (LAN) using the CSMA/CA medium sharing mechanism. A typical WLAN environment in which the mobile phones operate is described hereafter with reference to FIG. 1.

In FIG. 1, the QSTAs 11a, 11b, 11c and 11d are all wireless communications devices with their MAC functionality modified in a manner that permits each of them to synchronize or to order their service periods according to the MAC destination address associated with each. This ordering of the service periods allows the communications devices to transmit their trigger frames during unscheduled service periods without the possibility that they will collide and to transmit their trigger frames on a priority basis over other unmodified wireless communications devices. FIG. 1 illustrates two QSTAs 11a and 11b associated with QAP 12a and two QSTAs 11c and 11d associated with QAP 12b, but there could be more or fewer QSTAs associated with either one of the two QAPs. The QAP 12a, for example, can receive packets of information from QSTA (11a), and may buffer these packets before ultimately transmitting them to a destination QSTA, QSTA 11b for example, after receiving a trigger frame from the destination QSTA 11b. Communications over the LAN 10 between the QAPs 12a and 12b is managed by Router 13, or any other type of device that is able to receive packets from one device and forward them to another device. The well known IEEE 802.3 (Ethernet) standard protocol is employed on the WLAN for communications between the QAPs, the Router 13 and the IPPBX 14. Router 13 generally operates to receive packets of information from one QAP, QAP 12a for instance, and to transmit them to another QAP, QAP 12b, for instance, according to the destination address information contained in the packet. The IPPBX 14 operates to direct packets of information to either a private, wired phone system 15 or to a public phone system 16 depending upon the destination address contained in a particular packet of information.

Figure 2:
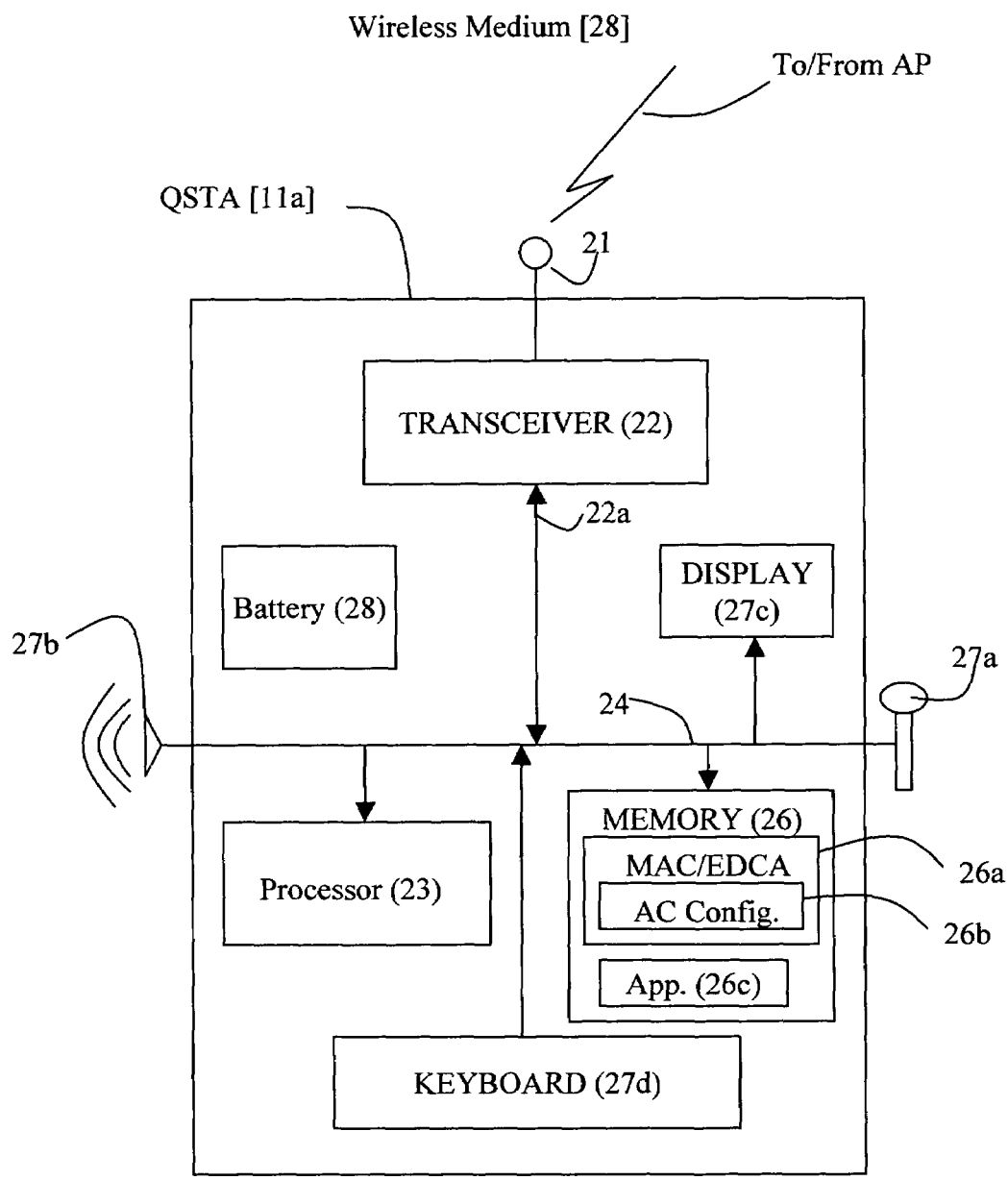
FIG. 2 is a functional block diagram of a mobile phone.

FIG. 2 is a functional block diagram of any one of the QSTAs 11a, 11b, 11c, or 11d which, for the purposes of this application, can all be considered of equivalent capability and to have equivalent configurations and will be referred to collectively as QSTA 11. QSTA 11 includes an antenna 21, which operates to propagate wireless signals and is the initial reception point for incoming wireless signals. The antenna is connected to a transceiver 22, which operates to demodulate the signals containing voice information received from the antenna or to modulate signals prior to their being sent to the antenna. The transceiver is connected over a bus 24 to, a processor 23 and memory 26. Although the QSTA also may include a microphone, a speaker, a display and a keyboard, these elements are not necessary for the operation on our invention and so will not be described in this application.

Continuing to refer to FIG. 2, the processor 23 generally functions in conjunction with memory 26, and under the control of a telephony application 26c stored in the memory, to perform certain functions necessary for the operation of the phone. The telephony application 26c generally controls such QSTA functionality as initiating, maintaining, and tearing down communications sessions. The memory 26 can be an EEPROM, RAM or flash memory and is generally employed to store the telephony application, as previously mentioned, and to store a software module that implements medium access control (MAC) functionality that is enhanced according to the 802.11e standard to support WLAN applications with QoS requirements. More specifically, the MAC implements enhanced distributed channel access functionality (EDCA) which we have modified to perform the method of our invention which operates to order the service periods of mobile phones operating in the U-APSD mode that are associated with a particular access point. As mentioned above, the fundamental medium access protocol specified by 802.11e is an enhanced distributed coordination access (EDCA) function, which supports a carrier sense multiple access with collision avoidance (CSMA/CA) protocol. Generally, the EDCA function operates to permit automatic medium sharing between compatible physical mediums through the use of the CSMA/CA protocol and a random back off time following a busy condition. Additionally, all wireless devices use immediate positive acknowledgement (ACK) where retransmission of frames, that are not successfully received, is scheduled by the sender if no ACK is received. In operation, the CSMA/CA protocol reduces the probability that collisions will occur between two or more wireless devices that have been waiting for the medium to become idle. A distributed carrier sense strategy is employed where each wireless device in the LAN monitors the state of the medium and at the point that the medium becomes idle, the device starts a random back off procedure which must be completed before it gains access to the medium. The use of this random back off procedure decreases the probability that collisions will occur.

As mentioned above, the 802.11e standard specifies some QoS enhancements to the DCF specified by 802.11 and one of these enhancements is the previously mentioned U-APSD mode of operation. The 802.11e standard refers to this contention-based channel access method as the enhanced distributed channel access (EDCA) function and at least one instance of this function is stored in memory 26 as EDCA function 26a shown in FIG. 2. As previously mentioned, the method of our invention is implemented in the EDCA 26a and it operates to modify the operation of the 802.11e standards based EDCA function, with respect to a QSTA in a lower powered state, such that the service periods for all QSTA's associated with a particular QAP are ordered which has the effect that trigger frames transmitted by these QSTA's will not collide with each other. Our invention results in a higher quality of service and permits the use of a more aggressive algorithm in order to gain access to the wireless medium which results in higher service priority. Additionally, the method of our invention packs the ordered service periods into a "tight" group which has the beneficial effect of increased bandwidth availability to perform other operations such as dynamic channel access (DCA) and transitioning to a lower power state.

Figure 3:
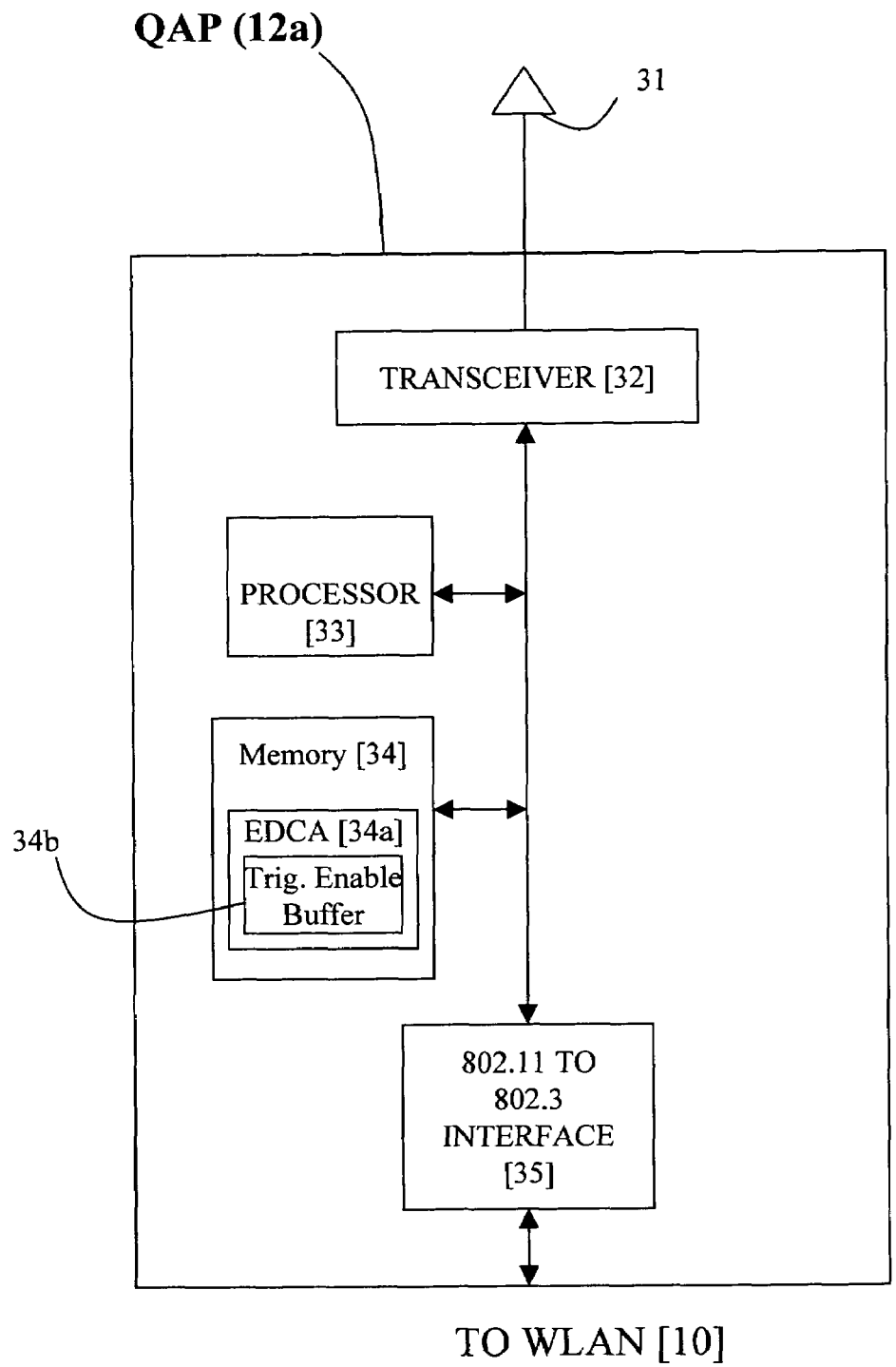
FIG. 3 is a functional block diagram of an access point.

FIG. 3 is a functional block diagram of QAP 12a or 12b both of which for the purpose of this description can be considered to be similarly enabled and configured. Both QAP 12a and 12b generally operate to receive packets of information transmitted by a QSTA, which in the case of QAP 12a could be QSTA 11a for instance, places the packets into a queue or queues where they are available for transmission to a destination QSTA, QSTA 11b for instance, associated with the same QAP or to be transmitted to another QAP, QAP 12b for instance, over the wired portion of the WLAN 10. In the later case in which the frames are to be transmitted to QAP 12b, QAP 12a converts the packets from the 802.11 format to the well known 802.3 Ethernet format for transmission over the wired portion of the WLAN 10 to QAP 12b where they are converted back to the 802.11 format for transmission over the wireless medium to QSTA 11c or 11d for instance. From the perspective of the WLAN 10, QAPs 12a and 12b have similar functionality to a QSTA, in as much as it receives packets of information from QSTAs, places them in a queue according to their priority, contends for the medium according to the CSMA/CA protocol, and when it gains access to the medium, transmits the packets according to their priority to another QSTA. Unlike a QSTA, a QAP generates beacons used, for among other things, to broadcast capability information to QSTAs within transmission range and it is the target for QSTA association requests. Specifically, the QAP 12a of FIG. 3 has an antenna 31, transceiver 32, processor 33, and memory 34 all of which possess functionality similar to the antenna 21, transceiver 22, processor 23, and memory 26 of QSTA 11a of FIG. 2. Specifically, the EDCA function 34a used by the QAP is stored in memory 34 and in this case the QSTA 11a will request that the QAP use the U-APSD mode of operation. This QSTA request is made in the form of a TSPEC which will be discussed later with reference to FIG. 4.

The 802.11 to 802.3 interface 35 of FIG. 3 generally operates to convert packets of information from the 802.11 format to the Ethernet format and transmit these frames to the wired portion of WLAN 10.

Returning to FIG. 2, the telephony application 26c generally operates to control or manage when in time a QSTA transitions from a higher powered state, such as when the QSTA is in "call" mode, to a lower powered state, such as when the phone is in U-APSD mode, the telephony application operates to control the setting of bits in certain fields of frames that are transmitted by the QSTA, and the telephony application manages the process by which QSTAs associate with QAPs when roaming from one QAP to another. Generally, when roaming from one cell to another, a QSTA will periodically receive beacons transmitted from at least one AP that is within range and examine the contents of the beacon to determine whether the AP is a QAP and capable of supporting the transmission and reception of packets formatted according to the 802.11e specification and to examine the beacon for a time stamp which is used when running the time stamp function specified by 802.11 which operates to coordinate the operation of the QAP that sent the beacon and the QSTA that received the beacon. The format and content of beacons is described in 802.11 and 802.11e and well know to those familiar with these standards and so will not be discussed here in any detail other than to indicate that a beacon can contain information about the capability of a QAP to support QoS functionality such as which access categories are being supported and a beacon will also include a time stamp that a QSTA uses to synchronize its internal clock to. In the event that the AP is QoS capable, or that it is a QAP, the QSTA will then transmit an association request frame to the QAP to determine whether or not the QAP is available to receive its traffic. The format of the association request frame described above will now be described with respect to FIG. 4.

Figure 4:
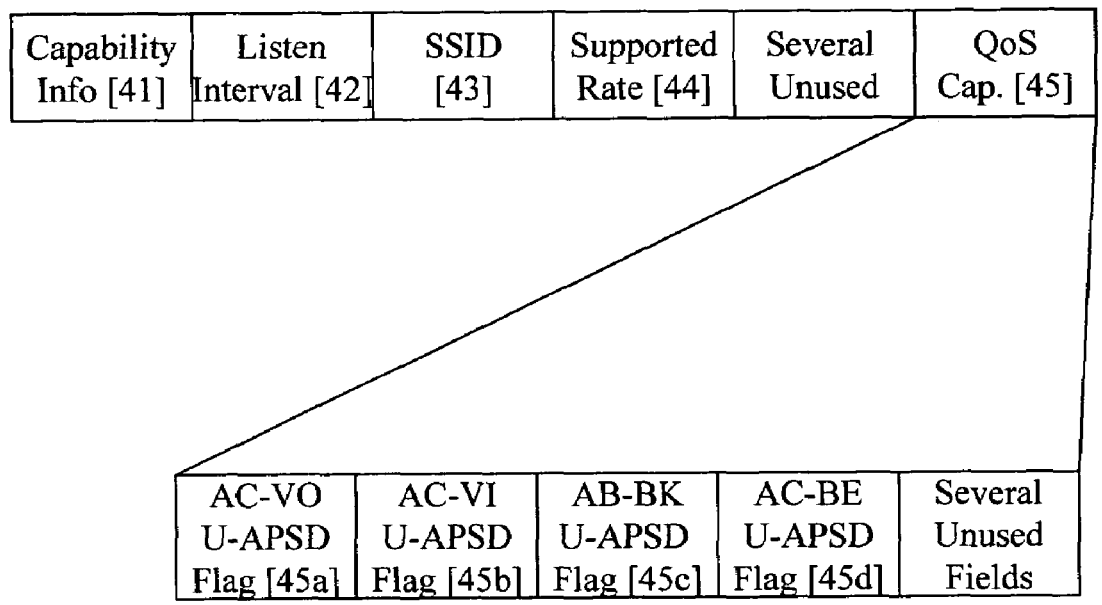
FIG. 4 is a diagram showing the format of the body of an association request frame.

FIG. 4 illustrates the format of the body of an association request frame showing a number of fields including a capability information field 41, a listen interval field 42, a SSID field 43, a supported rate field 44, a number of null fields and QoS capability field 45. We will not describe how the fields other than the QoS capability field will be used as their use is well understood by those familiar with the 802.11 standard and not important for to the description of our invention. The QoS Capability field 45 is subdivided into a number of subfields, namely; an AC-VO/U-APSD Flag subfield 45a, an AC-VI/U-APSD Flag subfield 45b, an AC-BK/U-APSD Flag subfield 45c and an AC-BE/U-APSD Flag subfield 45d, plus three other fields that are not important for the purposes of this describing this invention. As mentioned in the previous paragraph, flag bits can be set in one or more of the four U-APSD subfields 45a-d that make up the QoS Capability field 45 of the association request frame body 40 format. So for instance, in the event that the AC-VO/U-APSD Flag bit in subfield 45a is set to "1", this would indicate to QAP 12a that the AC associated with a packet of voice information for this QSTA is both trigger and delivery enabled when the QSTA is in U-APSD power save mode. As the result of receiving the information in subfield 45a the QAP 12a will set the AC associated with packets of voice information to be transmitted to QSTA 11a to be trigger enabled and all frames that the QAP receives that are to be transmitted to QSTA 11a will be buffered until the QAP receives a trigger frame.

In response to receiving the association request from QSTA 11a, the QAP 12a will send an association response to the QSTA which includes, among other information, a set of EDCA parameters which indicates to the QSTA that the QAP is configured to support the QSTA in U-APSD mode. All of the information needed to set bits in fields of the management frames used to enable U-APSD mode and to configure a QAP to enable it to manage the transmission of frame of information to a QSTA in U-APSD mode is contained in the EDCA 26a stored in memory 26 of each one of the QSTAs 11a-d. The instructions utilized by the EDCA to format the management frames will not be described here as someone of skill in the art in this area could easily implement such instructions.

Now, assuming that QSTA 11a is associated with QAP 12a, the QSTA can transmit a TSPEC request in a management frame also known as a management action frame. The TSPEC request is transmitted in order to request admission of a traffic flow with access categories that require priority transmission (AC_VO for instance). More specifically, a TSPEC describes the traffic characteristics and the QoS requirements of a traffic stream. The main purpose of the TSPEC is to reserve resources within a hybrid coordinator and modify the hybrid coordinators scheduling behavior. It also allows other parameters to be specified that are associated with the traffic stream, such as a traffic classifier and ACK policy. The action frame, mentioned above, has one field dedicated to various elements one of which is a TSPEC element. The body of the TSPEC element field is divided into a number of fields one of which is dedicated to TSPEC information or TS info. The TS info field is further divided into several fields one of which is the power save behavior (PSB) field. The PSB field is one bit that determines the power save method of deliver of buffered traffic used when the QSTA is operating in power save mode. The PSB field bit is set to "zero" when the QSTA is operating in legacy power save mode and it is set to "1" when operating in U-APSD mode.

The power management mode of a QSTA is indicated in the power management field of each frame control field it transmits to a QAP. When the power management field is set to "1", this indicates that the QSTA is transitioning to the lower powered U-APSD mode of operation and the QAP will start buffering frames of information associated with a particular AC at that time Assuming that the traffic flow is admitted by the QAP, and that QAP 12a is configured to manage frames of voice information to be transmitted to QSTA 11a access category VO when this QSTA is in the U-APSD mode of operation, 802.11e specifies that a QSTA, QSTA (11a) in this case, can transition to a higher powered state, contend for the wireless medium and periodically initiate an unscheduled service period (SP) to, among other things, transmit a trigger frame associated with in this case AC-VO to the QAP it is associated with, which in this case is QAP 12a. As the result of QAP 12a receiving the trigger frame, it responds by transmitting at least one frame of info labeled or prioritized as AC-VO and which is buffered waiting for delivery to QSTA 11a. The trigger frame can be a either a QoS data or null frame as specified by the 802.11e specification and for the purposes of this description we will assume that the trigger frame is a data frame. The periodicity and duration of these unscheduled SPs is controlled by information in the TSPEC which is controlled by the telephony application 25c in FIG. 2 and depends upon such things as the QSTA data rate and the median size of an MSDU (MAC service data unit).

Now, according to the 802.11 specification, a QSTA in U-APSD mode will periodically initiate an unscheduled SP during which it can transmit a trigger frame to the associated QAP. If two or more of the QSTAs in U-APSD mode wake up and attempt to transmit a trigger frame at the same time during an unscheduled SP, it is probable that the trigger frames could collide. So when two QSTAs initiate an unscheduled SP by waking up and sensing that the medium is free, they will attempt to transmit a trigger frame after an AIFS time and after the back off time for the AC has expired. If at this point in time both QSTAs attempt to transmit a trigger frame, there is a collision that results in both QSTAs initiating the back off and retransmission procedure specified by 802.11. However, as mentioned previously, the method of our invention allows the unscheduled service periods, during which the trigger frames are transmitted, for all QSTAs associated with a particular QAP to be ordered in time into a tightly packed group. This ordering of service periods results in the avoidance of collisions between trigger frames transmitted by two or more QSTAs. More specifically, the method of our invention operates to arrange service periods in time according to the MAC destination address of each QSTA and our invention further operates to place these service periods into a tightly packed group, such that they are separated in time by the minimum inter-service period time duration. The ordering of service periods according to MAC address has the effect that each QSTA, which is a member of a group of QSTAs, will know when it can initiate its unscheduled service period by detecting an end of service period (EOSP) bit set in a packet sent to the QSTA that is comes immediately before it in this group. This tightly packed group of service periods prevents other communications devices associated with the same access point from gaining access to the medium until after all QSTAs configured in the U-APDS mode have the opportunity to receive packets buffered at the access point. In other words, our invention ensures that phones configured to operate in the U-APSD mode, and which implement our invention, are able to access the medium to transmit trigger frames on a priority basis over any other communications devices attempts to gain access to the medium. Still further, tightly packing the service periods results in more time being available for a QSTA to conduct such operations as DCA.

The preferred embodiment of our invention will be described with reference to FIGS. 5a, 5b and 5c which illustrate a logical flow diagram showing the operation of a QSTA, QSTA 11a in this case, to implement the method of our invention. It should be assumed that QSTA 11a has been configured to operate in the U-APSD mode and that standard trigger frame TX logic is enabled and that the QSTA is associated with QAP 12a. Further, as QSTA 11a may be attempting to position or insert its service period into an ordered grouping of service periods initiated by one or more other QSTAs, we will refer to QSTA 11a as a "new QSTA". Starting with FIG. 5a in step 1, the new QSTA starts to sense the medium for transmissions to other QSTAs enabled to operate in the U-APSD mode. Specifically, the new QSTA examines the MAC header in all of the packets transmitted by a QAP to the other communications devices associated with the QAP to detect the destination address and the organizationally unique identifier (OUI) of the QSTA to which the packet is sent. The new QSTA, in step 2, uses the destination address and the OUI to build a first list of QSTAs addresses to which packets are transmitted to during a current QoS period. This first list is ordered according to the destination addresses detected by the new QSTA and then stored in memory. The ordering can be from lowest to highest MAC destination address or viseversa. Also, an address other than a MAC destination address could be used to generate the ordered list, but we have elected to use the MAC address as it is not encrypted and so is easy for the QSTAs to detect. Further, the new QSTA does not have to build and maintain a list that includes all of the QSTAs in the group. The new QSTA, or any phone in the list, only has to store the destination address of the phone that is immediately ahead of it in the list or the "before QSTA" and immediately behind it in the list or the "after QSTA".

A "tightly packed" group of service periods means that the beginning of one service period in the group starts less than the minimum time interval specified for any other wireless device associated with the access point to begin arbitrating for the medium after the end of a previous service period in the group. By less than the minimum, in this case, we mean that the time between service periods is less than the time interval specified by the 802.11 standard, or any wireless communications standard for that matter, for any other wireless communications device associated with the same access point to begin arbitrating for the wireless medium. In the 802.11 standard, this minimum time interval is call a "DIFS" or an "AIFS" time and for the purposes of this description and in our preferred embodiment, we elected to permit a QSTA to transmit an ACK plus a SIFS time after the end of a preceding transmission. But regardless, this time is not long enough for another communications device associated with QAP12a to gain access to the medium.

Figure 5A:
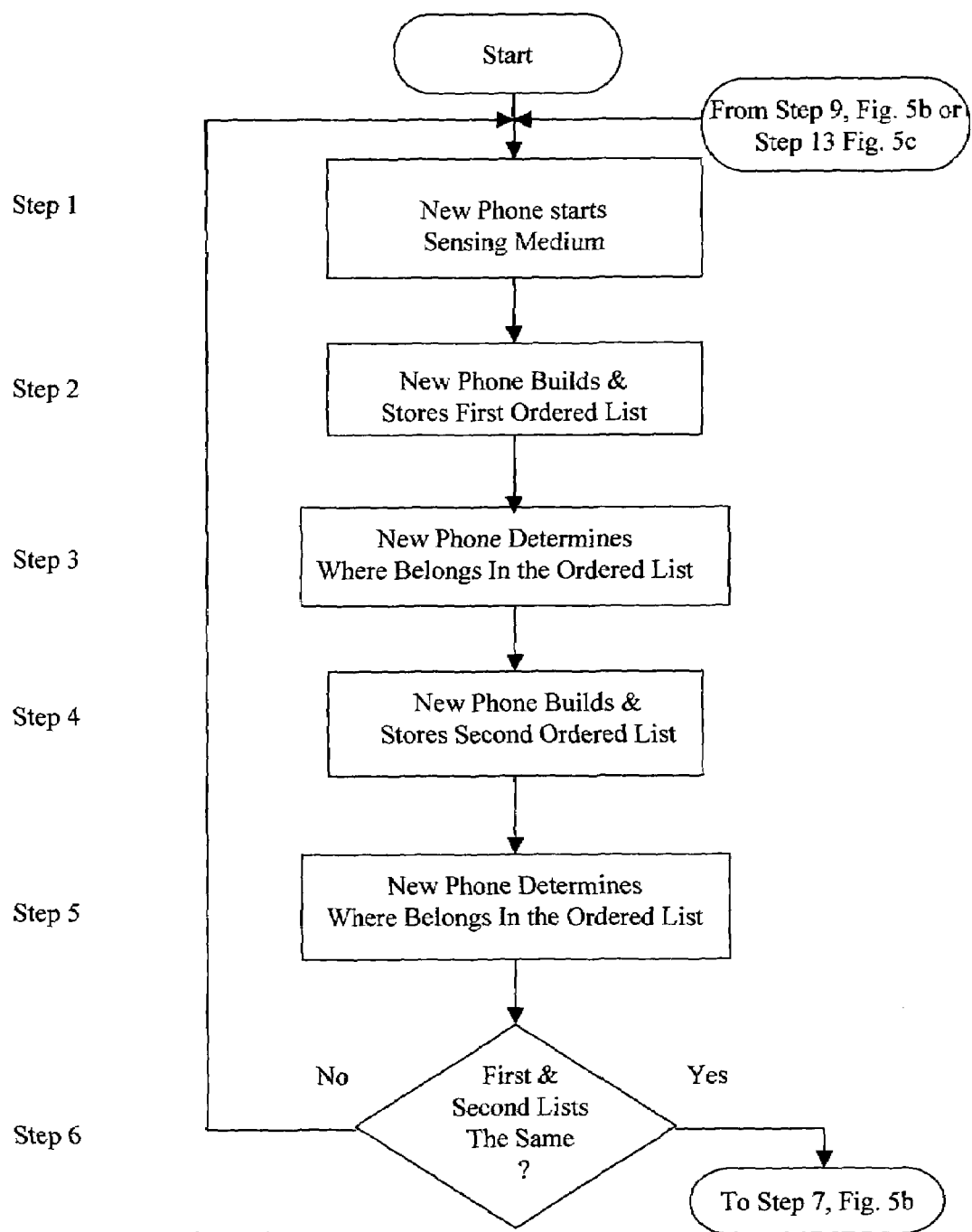
FIG. 5a is a logic flow diagram of a portion of the method of our invention.

Continuing to refer to FIG. 5a, in step 3 the new QSTA examines the stored first list of ordered MAC destination addresses to detect a before QSTA and an after QSAT. Assuming in this case that the QSTAs in a group are ordered according to an ascending destination address, a before QSTA with respect to the new QSTA has the meaning that its destination address would be lower than the destination address of the new QSTA and the after QSTA has the meaning that its address is higher than the new QSTA. Each MAC destination address is composed of six to eight octets of information. The first three octets are dedicated to the OUI address and the last three to five octets are selected, typically by the manufacturer, to be some unique address/identifier. So for instance, if the first ordered list of addresses is composed of the two addresses, 101 . . . 100003 and 101 . . . 100007, and the destination address of the new QSTA is 100 . . . 100005, then the new QSTA will determine that its service period should start immediately after the end of the service period associated with the QSTA with the destination address of 100 . . . 100003 or the before QSTA and immediately before the QSTA with the destination address of 101 . . . 100007, or the after QSTA. In step 4, during the next QoS period the new QSTA again senses the medium for packets transmitted to the other QSTAs and for each packet it examines the MAC header for the OUI and destination address to build a second tightly packed, ordered list that represents the QSTAs that have received packets during the current QoS period and stores this second list in memory. In step 5, the new QSTA examines the stored second ordered list to detect a before and an after QSTA as described previously in step 3 above. In step 6, the phone compares the stored first ordered list to the stored second ordered list and if the result of this comparison indicates that both lists are the same, the match counter previously mentioned is set to "one" and the process proceeds to step 7 in FIG. 5b, otherwise the process returns to step 1.

Figure 5B:
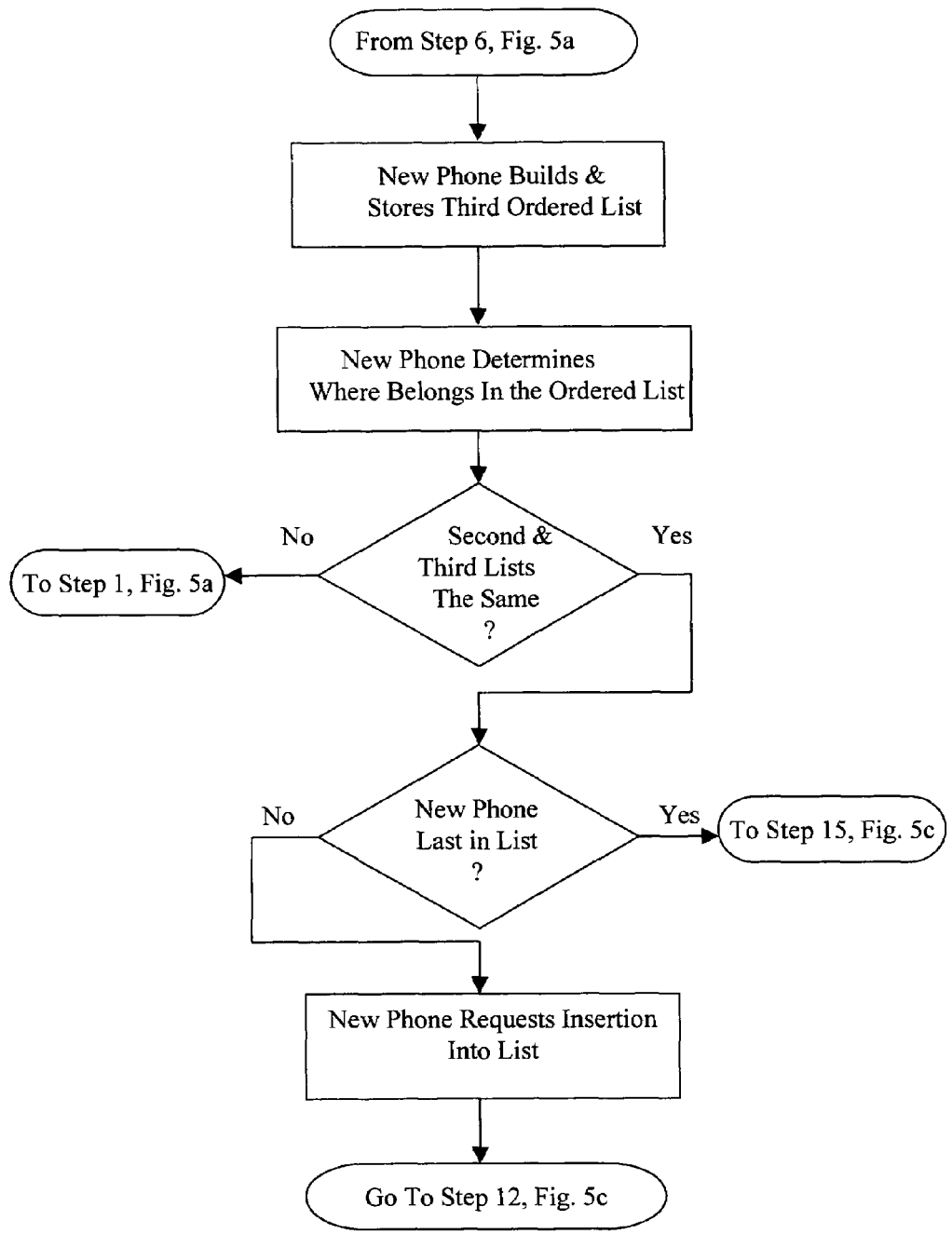

Referring now to FIG. 5b, assuming that the results of the comparison in step 6 indicates that the two lists are the same, in step 7 during the next QoS period the new QSTA again senses the medium for packets transmitted to the other QSTAs and for each packet it examines the MAC header for the OUI and destination address to build a third tightly packed, ordered list that represents the QSTAs that have received packets during the current QoS period and stores this third list in memory. In step 8, the new QSTA examines the stored third ordered list to detect a before and after QSTA as described previously. In step 9, the phone compares the stored second ordered list to the stored third ordered list and if the result of this comparison indicates that both lists are the same, the match counter is set to "two" and the process proceeds to step 10, otherwise the process returns to step 1 in FIG. 5a. Although we describe the preferred embodiment of our invention in terms of the new QSTA generating three ordered lists in three sequential QoS periods that are the same, this is not a limitation of our invention as the process of our invention described with reference to FIGS. 5a, 5b and 5c will operate if only one ordered list is generated or if more than three ordered lists are generated. Generally, it is desirable to generate two or more matching ordered lists in sequential QoS periods as a means for the phone to determine that the ordered list is "stable". If the ordered list is not stable, that is, if the before and after QSTAs are changing, the new QSTA will not be able to start its service period because it will be expecting a destination address that will not in fact detect and/or it will not be able to place itself into the order list because it will get no response to a request it sends to the after QSTA.

Continuing to refer to FIG. 5b, in step 10 if the new QSTA determines that it is the last QSTA in the ordered list (can come to this determination because it compares its MAC address to the addresses in the list and determines where it fits into the list), then the process proceeds to step 15, otherwise if the new QSTA determines that it is not the last QSTA in the ordered list, the process proceeds to step 11 at which point the new QSTA transmits a directed LLC packet to the after QSTA requesting to have its service period come immediately before this phone. Specifically, this request transmitted by the new QSTA in the directed LLC packet to the after QSTA has the effect that the after QSTA may accept or reject the new QSTA as it's before phone. More specifically, if the after phone accepts the request from the new QSTA, the after phone will then not start its unscheduled service period until it detects the EOSP bit set in a packet sent to the new QSTA.

Figure 5C:
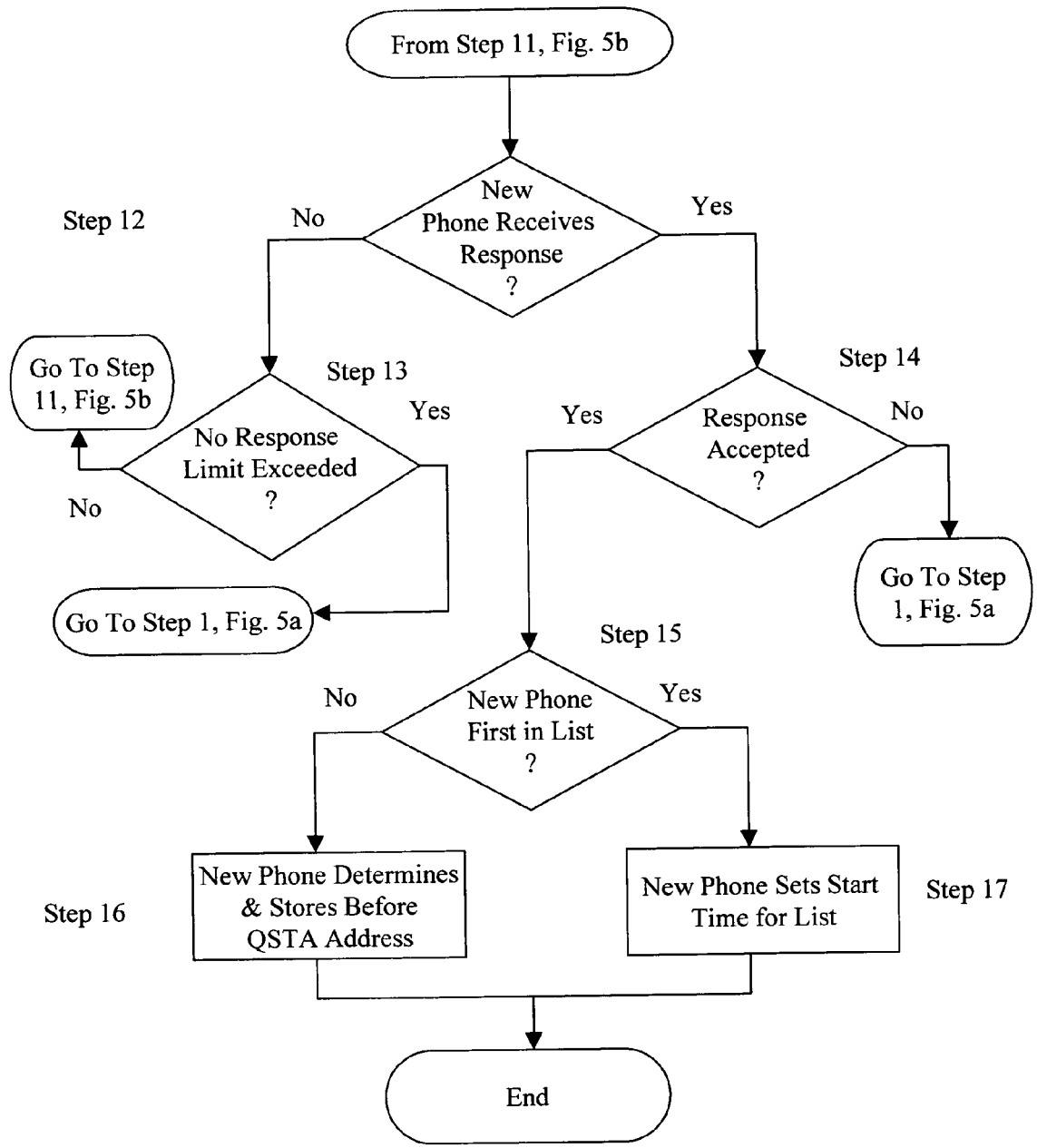
FIG. 5c is a continuation of the logical flow diagram in FIG. 5b.

Referring now to FIG. 5c, if in step 12 the new QSTA receives a response to the directed LLC packet it transmitted in step 11, the process proceeds to step 14 where the new QSTA examines the response and if it indicates that the after QSTA accepts the new QSTAs request to be placed before it in the ordered list, the process proceeds to step 15. If on the other hand the new QSTA receives a response that indicates that its request has not been accepted, then the process returns to step 1 in FIG. 5a.

Continuing to refer to FIG. 5c, if at step 12, the new QSTA does not receive a response, then in step 13, the new QSTA will wait up to two QoS periods to receive a response after which time it will return to step 11 in FIG. 5b and resend the request. The new QSTA will resend the request some predetermined number of times, after which if the new QSTA still does not receive a response the process will return to step 1 in FIG. 5a. Although in the preferred embodiment of our invention, this time limit is set to be two QoS periods, it should be understood that this time limit could be lesser or greater than two QoS periods. In step 15, if after examining the ordered list the new QSTA determines that it is not the first phone in the list, the process proceeds to step 16 at which point the new QSTA stores the destination address of the before QSTA and then enters the U-APSD mode of operation and will now operate to start its unscheduled service period immediately after it detects an EOSP bit set in a packet transmitted to the before phone. Once the new QSTA detects this packet with the EOSP bit set, it waits an ACK time and then a SIFS time before starting its own service period. If, on the other hand, the new QSTA determines that it is the first QSTA in the list, it will immediately start contending for the medium and to perform any back off that is necessary to gain access. At the point in time that the new QSTA gain access to the medium, this time becomes the starting time for the ordered list.

Although we have described our invention in the context of a wireless LAN that includes mobile phones and access points that are designed to operate according the IEEE 802.11 standard, it should be understood that the method of our invention is not limited only to this communication standard as it could easily be implemented in communications devices that operated according to the Bluetooth communications protocol or other communications standards and protocols.

We claim:

1. In a wireless LAN including at least one access point and a plurality of wireless communication devices associated with the access point, a method for ordering unscheduled service periods initiated by one or more of the wireless communication devices according to a network address comprising the steps of:

a first wireless communications device building and storing an ordered list of network addresses associated with a plurality of the wireless communications devices that are receiving packets during a current QoS period;

the first wireless communications device examining the stored, ordered list of network addresses to identify a second wireless communications device with a network address that comes immediately before it in the ordered list and to identify a third wireless communications device with a network address that comes immediately after it in the ordered list;

the first wireless communications device transmitting a request to the third wireless communications device to accept its network address as the address the third wireless communications device uses to initiate an unscheduled service period;

the third wireless communications device receiving the request from the first wireless communications device and responding by accepting the request;

the first wireless communications device using the network address of the second wireless communications device to initiate an unscheduled service period; and the third wireless communications device using the network address of the first wireless communications device to initiate an unscheduled service period.

2. The method of claim 1, wherein the plurality of wireless communication devices are QoS capable mobile phones.

3. The method of claim 1, wherein the access point is a QoS capable access point.

4. The method of claim 1, wherein the two or more network addresses are MAC destination addresses.

5. The method of claim 1, wherein the ordered list of network addresses is ordered according to the MAC destination address associated with each one of the plurality of wireless communications devices.

6. The method of claim 1, wherein the ordered list of network addresses is composed of a plurality of wireless communications devices whose service periods are ordered according to the MAC destination address associated with each of the wireless communication devices.

7. The method of claim 1 wherein the unscheduled service periods are tightly packed into a group ordered according to a MAC destination address associated with each of the wireless communication devices.

8. In a wireless LAN including an access point and a plurality of wireless communications devices that communicate over a wireless medium with an access point with which they are currently associated, a method of minimizing the time between unscheduled service periods in an ordered group composed of at least two of the plurality of wireless communications devices comprising the steps of:

a first wireless communications device building and storing an ordered list of network addresses associated with a plurality of the wireless communications devices that are receiving packets during a current QoS period;

the first wireless communications device examining the stored, ordered list of network addresses to identify a second wireless communications device with a network address that comes immediately before it in the ordered list and to identify a third wireless communications device with a network address that comes immediately after it in the ordered list;

the first wireless communications device transmitting a request to the third wireless communications device to accept its network address as the address the third wireless communications device uses to initiate an unscheduled service period;

the third wireless communications device receiving the request from the first wireless communications device and responding by accepting the request;

the first wireless communications device using the network address of the second wireless communications device to initiate an unscheduled service period after waiting less than the time interval specified for any other device associated with the access point to begin arbitrating for the medium; and the third wireless communications device using the network address of the first wireless communications device to initiate an unscheduled service period after waiting less than the time interval specified for any other device associated with the access point to begin arbitrating for the medium.

9. The method of claim 8, wherein the plurality of wireless communication devices are QoS capable mobile phones.

10. The method of claim 8, wherein the access point is a QoS capable access point.

11. The method of claim 8, wherein the list of network addresses are ordered according to a MAC destination address associated with each one of the plurality of wireless communications devices.

12. The method of claim 8, wherein the ordered group is composed of a plurality of wireless communications devices whose service periods are ordered according to the MAC destination address associated with each of the wireless communication devices.

13. The method of claim 8 wherein the unscheduled service periods are tightly packet in a group ordered according to a MAC destination address associated with each of the wireless communications devices.

14. In a wireless LAN including an access point and a plurality of wireless communication devices associated with the access point, a method of inserting an unscheduled service period associated with a new wireless communications device into an existing tightly packed, ordered group of at least two unscheduled service periods associated each of which are associated with one of the plurality of wireless communication devices comprising the steps of:

a first wireless communications device building and storing an ordered list of network addresses associated with a plurality of the wireless communications devices that are receiving packets during a current QoS period;

the first wireless communications device examining the stored, ordered list of network addresses to identify a second wireless communications device with a network address that comes immediately before it in the ordered list and to identify a third wireless communications device with a network address that comes immediately after it in the ordered list;

the first wireless communications device transmitting a request to the third wireless communications device to accept its network address as the address the third wireless communications device uses to initiate an unscheduled service period;

the third wireless communications device receiving the request from the first wireless communications device and responding to the first wireless communications device by accepting the request;

the first wireless communications device using the network address of the second wireless communications device to initiate an unscheduled service period after waiting less than the time interval specified for any other device associated with the access point to begin arbitrating for the medium; and the third wireless communications device using the network address of the first wireless communications device to initiate an unscheduled service period after waiting less than the time interval specified for any other device associated with the access point to begin arbitrating for the medium.

15. The method of claim 14, wherein the plurality of wireless communication devices are QoS capable mobile phones.

16. The method of claim 14, wherein the access point is a QoS capable access point.

17. The method of claim 14, wherein the ordered list of network addresses are ordered according to a MAC destination address associated with each one of the plurality of wireless communications devices.

18. The method of claim 14, wherein the ordered group is composed of a plurality of wireless communications devices whose service periods are ordered according to the MAC destination address associated with each of the wireless communication devices.

19. The method of claim 14 wherein the unscheduled service periods are tightly packet in a group ordered according to a MAC destination address associated with each of the wireless communications devices.

* * * * *